United States Patent
Zanella, Sr.

(10) Patent No.: US 11,872,743 B2
(45) Date of Patent: Jan. 16, 2024

(54) METHOD AND APPARATUS FOR INSPECTING LIQUID FILLED HOLLOW TRANSPARENT ARTICLES

(71) Applicant: AGR International, Inc., Butler, PA (US)

(72) Inventor: Mark F. Zanella, Sr., Butler, PA (US)

(73) Assignee: AGR International, Inc., Butler, PA (US)

( * ) Notice: Subject to any disclaimer, the term of this patent is extended or adjusted under 35 U.S.C. 154(b) by 188 days.

(21) Appl. No.: 17/422,567

(22) PCT Filed: Jan. 7, 2020

(86) PCT No.: PCT/US2020/012462
§ 371 (c)(1),
(2) Date: Jul. 13, 2021

(87) PCT Pub. No.: WO2020/150035
PCT Pub. Date: Jul. 23, 2020

(65) Prior Publication Data
US 2022/0097288 A1  Mar. 31, 2022

Related U.S. Application Data

(60) Provisional application No. 62/792,132, filed on Jan. 14, 2019.

(51) Int. Cl.
*G01B 11/06* (2006.01)
*B29C 49/80* (2006.01)
(Continued)

(52) U.S. Cl.
CPC .............. *B29C 49/80* (2013.01); *G01B 11/06* (2013.01); *G01N 21/9027* (2013.01); *G01N 21/9081* (2013.01); *B29C 2049/024* (2013.01)

(58) Field of Classification Search
CPC .............. G01N 21/9081; G01N 21/314; G01N 2021/3181; G01N 21/3504;
(Continued)

(56) References Cited

U.S. PATENT DOCUMENTS 5,097,216 A   3/1992  Dimmick, Sr. et al.
5,558,233 A   9/1996  Dimmick et al.
(Continued)

FOREIGN PATENT DOCUMENTS

DE   102004058408 A1 *  6/2006  ................ G01J 3/02
EP       1348932 A2 * 10/2003  ............. B29C 49/78
(Continued)

OTHER PUBLICATIONS

International Search Report and Written Opinion for International PCT Application No. PCT/US2020/012462, dated Mar. 24, 2020.

*Primary Examiner* — Michael P Stafira
(74) *Attorney, Agent, or Firm* — K&L Gates LLP

(57) ABSTRACT

An article-inspection apparatus includes a light source for directing light energy with multiple wavelengths at the article and multiple sensors to receive light reflected from external and internal surfaces of the wall of the article, with the reflections being used to compute a physical characteristic, e.g., wall thickness, of the container, due to the light absorption characteristics of the material of the wall of the article. A single light sensitive sensor may be used if the light source wavelengths can be selectively transmitted. The apparatus can be used for inspecting transparent plastic containers that are filled (with a liquid) or unfilled. The apparatus may determine the wall thickness of transparent plastic containers even if they have in-molded features or decorations that make their inner and outer walls non-parallel.

29 Claims, 10 Drawing Sheets

(51) Int. Cl.
*G01N 21/90* (2006.01)
*B29C 49/02* (2006.01)

(58) Field of Classification Search
CPC ....... G01N 2333/924; G01N 2800/044; G01N 33/53; G01N 33/6854; G01N 2021/0364; G01N 2021/3129; G01N 2021/845; G01N 21/0303; G01N 2201/023; G01N 33/543; G01N 2021/6439; G01N 21/6428; G01N 21/90; G01N 21/9501; G01N 23/00; G01N 33/00; G01N 33/0004; G01N 2021/7779; G01N 21/359; G01N 21/39; G01N 21/45; G01N 21/9027; G01N 33/54373; G01N 2021/3174; G01N 21/05; G01N 21/3151; G01N 21/33; G01N 21/47; G01N 21/9018; G01N 21/9036; G01N 21/9503; G01N 33/0024; G01N 33/0044; G01N 2021/646; G01N 2021/9063; G01N 2035/00564; G01N 2035/0436; G01N 21/031; G01N 21/25; G01N 21/253; G01N 21/8422; G01N 21/8483; G01N 2201/06113; G01N 2201/0697; G01N 2201/0698; G01N 2800/52; G01N 33/0036; G01N 33/50; G01N 33/538; G01N 33/554; G01N 33/564; G01N 33/573; G01N 33/574; G01N 33/57438; G01N 33/57488; G01N 33/576; G01N 33/68; G01N 35/00; G01N 35/0098; G01N 35/10; G01N 35/1016; G01N 35/1097; B29C 49/78; B29C 49/786; B29C 2049/7874; B29C 49/12; B29C 49/6409; B29C 2049/7861; B29C 2049/7864; B29C 2049/787; B29C 2049/78755; B29C 2049/7876; B29C 2049/78805; B29C 2049/78715; B29C 2949/0715; B29C 49/06; B29C 2049/801; B29C 49/42; B29C 49/4238; B29C 49/64; B29C 49/783; B29C 49/80; B29C 2049/024; B29C 49/08; B29C 49/36; G01B 11/06; G01B 11/0633; G01B 11/245; G01B 11/0658; G01B 11/0691
See application file for complete search history.

(56) References Cited

U.S. PATENT DOCUMENTS

| | | | |
|---|---|---|---|
| 5,917,328 A | 6/1999 | Dimmick et al. | |
| 5,991,018 A | 11/1999 | Imaizumi et al. | |
| 6,137,575 A | 10/2000 | Sugiyama et al. | |
| 6,549,292 B1 | 4/2003 | Schmidt et al. | |
| 6,863,860 B1 | 3/2005 | Birckbichler et al. | |
| 6,911,653 B2 * | 6/2005 | Yagita ................ G01N 21/9018 250/341.1 |
| 7,374,713 B2 | 5/2008 | Birckbichler et al. | |
| 7,378,047 B2 | 5/2008 | Birckbichler et al. | |
| 7,780,898 B2 | 8/2010 | Birckbichler et al. | |
| 7,914,726 B2 | 3/2011 | Andison et al. | |
| 7,924,421 B2 * | 4/2011 | Schmidt ............ G01N 21/9081 250/223 B |
| 8,208,141 B2 | 6/2012 | Schmidt et al. | |
| 8,818,755 B2 | 8/2014 | Wolfe et al. | |
| 9,539,756 B2 | 1/2017 | Wolfe et al. | |
| 9,868,247 B2 | 1/2018 | Wolfe et al. | |
| 10,183,440 B2 | 1/2019 | Wolfe et al. | |
| 10,612,909 B2 | 4/2020 | Hanan et al. | |
| 2006/0098191 A1 * | 5/2006 | Ringlien ................ G01N 21/90 356/239.4 |
| 2011/0280013 A1 | 11/2011 | Tafas et al. | |
| 2044/0280013 | 11/2011 | Tafas | |
| 2019/0232544 A1 | 8/2019 | Tabata et al. | |

FOREIGN PATENT DOCUMENTS

| | | | |
|---|---|---|---|
| WO | WO-0233349 A1 * | 4/2002 | ............. G01B 11/06 |
| WO | 2005106387 A1 | 11/2005 | |
| WO | 2008027569 A1 | 3/2008 | |
| WO | 2020150035 A | 7/2020 | |

* cited by examiner

METHOD AND APPARATUS FOR INSPECTING LIQUID FILLED HOLLOW TRANSPARENT ARTICLES

PRIORITY CLAIM

The present application claims priority to U.S. provisional patent application Ser. No. 62/792,132, filed Jan. 14, 2019, having the same title and inventor as set forth above, and which is incorporated herein by reference in its entirety.

BACKGROUND OF THE INVENTION

Field of the Invention

The present invention is directed toward an optical method and associated apparatus for determining a physical property of hollow transparent articles and, more specifically, it is directed toward such a method and apparatus for determining the characteristic, such as wall thickness, by means of multiple inspection light beam wavelengths, which are received by one or more detectors and processed to ascertain the desired information.

Description of the Prior Art

Polyethylene terephthalate (PET) and other types of plastic containers are commonly produced utilizing a machine referred to as a reheat, stretch and blow molder. The blow molder receives plastic preforms and outputs the plastic containers. When a preform is received into a blow molder, it is initially heated and placed into a mold. A rod stretches the preform while air is being blown into the preform causing it to stretch axially and circumferentially, and take the shape of the mold. The formed plastic containers must be inspected in order to make sure that the wall thickness is adequate for the desired purpose and that the use of excess material is minimized.

One way to inspect the container is to employ off-line sampling inspection techniques whereby, at a periodic intervals, which might be on the order of once per hour, a container is removed from the conveyance system after the container emerges from the blow-molder and is destructively tested by cutting the container into multiple, horizontal sections, which are then weighed, with the weight being correlated with the wall thickness. Another way is optical non-contacting means in which, for example, light is directed through the container, with the amount of light absorbed being indicative of the wall thickness.

Recently, blow molders that use liquid instead of air to stretch the preform have been proposed. That is, the preform is stretched to the container's shape with the end-product liquid. Optical wall-thickness sensing means that direct light through the container will not adequately work with plastic containers that are already filled with liquid contents.

SUMMARY

According to one general aspect, the methods and apparatus of the present invention determine a physical characteristic, e.g., wall thickness, of a transparent article (e.g., a plastic container) by illuminating an area of interest of the article with light, collecting the reflections from the inner and outer wall interfaces, comparing the relative amounts of lights collected for two or more wavelengths or ranges of wavelengths, and deriving a relationship between light differences and wall thickness. This technique works with liquid-formed containers because the liquid inside the formed container, with an index of refraction generally near water and different from that of the transparent article, still allows the inner refection.

In various implementations, an apparatus of the present invention includes a light source of multiple wavelengths, which may be an incandescent source, a plurality of lasers or light emitting diodes, for emitting a multi-spectral light beam. A plurality of sensors is employed to receive the light reflected from the external and internal surfaces of the wall of the article and to convert the same into electrical signals, from which a programmed processor computes the physical characteristic, e.g., wall thickness. A single light sensitive sensor may be used if the light source wavelengths can be selectively transmitted.

In various implementations, the method/apparatus is used for inspecting transparent plastic containers that are filled (with a liquid) or unfilled. As such, the method/apparatus may determine wall thickness of the transparent plastic containers using absorption characteristics of the plastic. The method/apparatus may also determine the wall thickness of the transparent plastic containers even if they have in-molded features or decorations that make their inner and outer walls non-parallel. Also, the method/apparatus may not require the use of positional limiting imaging lenses.

These and other benefits and features of the present invention will be apparent from the description that follows.

DRAWINGS

Various embodiments of the present invention are described herein by way of example in conjunction with the following figures.

DESCRIPTION

As employed herein, reference to "transparent hollow article" shall refer to hollow articles including containers and tubes which have adequate transparency to permit the light transmission needed for the inspection systems described herein to function and shall expressly include tinted articles which meet these characteristics. The term shall also include articles that are sufficiently transparent to either the visible or infrared spectrum as well as known absorption bands. The term also shall embrace articles made of glass and/or plastic. The term also encompasses article that are filled with contents that are different than the material of the article; that is, a plastic or glass container is still "hollow" when it is filled with a gas (such as air) or fluid such as a liquid. The term "wall thickness" shall refer to any portion of the transparent hollow article which is formed such as the neck, sidewall, heel, base or foot.

Figure 1:
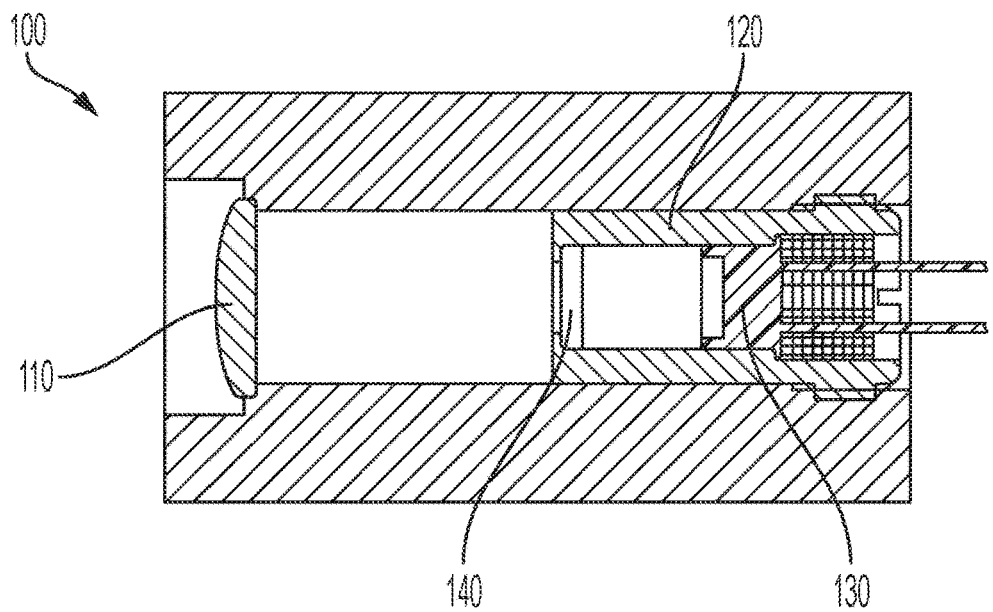
FIG. 1 illustrates schematically an example of the optical sub-system.

FIG. 1 shows a sectional view of an example of an optical sub-system that is usable in a transparent hollow article inspection system according to various embodiments of the present invention. The optical sub-system 100 is comprised of a lens 110, an optical component holder 120, an optical component 130, and an optical filter 140. The optical component 130 may be a photodetector or a light source, depending on whether the optical sub-system is a detector or emitter. In either instance, the optical component 130 may be positioned and held in place by the optical component holder 120 so the optical component's distance is at the effective focal length of the lens 110. In this manner, collimated light exits the optical sub-system when the optical component 130 is a light source and incoming collimated light is received by the optical component 130 when the optical component 130 is a photodetector. The optical sub-system 100 may be used as part of a larger inspection system for transparent hollow articles.

Figure 2:
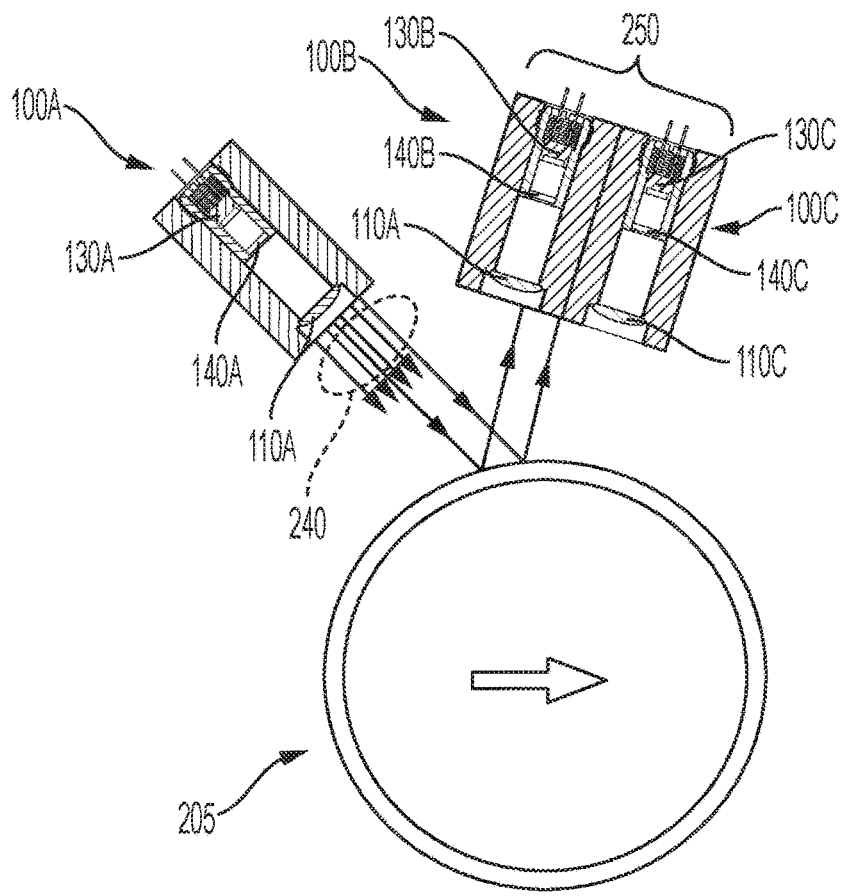
FIG. 2 illustrates schematically a simplified example of the measurement system.

For example, FIG. 2 shows aspects of a container measurement system for measuring a characteristic of container 205, such as the wall thickness of the container. The illustrated measurement system comprises three optical sub-systems 100A-C. A first optical sub-system 100A is configured as a collimated light source. As such, the optical sub-system 100A could be equipped with an incandescent source or a multi-element LED that emits light energy at multiple wavelengths as its optical element 130A, including a reference wavelength and an absorption wavelength. The optical filter 140A can be used in the case of an incandescent source if the selection of wavelengths needs to be limited. The optical filter 140A could also be etched to limit the selection of light by using a pinhole. Alternately, the exit lens 110A could be equipped with a precision optical slit or other aperture to further refine the selection of light rays 240 exiting the optical sub-system 100A. Additionally, the exit lens 110A could be chosen to converge the exiting light to counteract the diverging effect of the container curvature and increase the amount of light collected by the receiver. The examples are provided with collimated light for easier understanding, but collimation is not required.

FIG. 2 depicts the container 205 moving (left to right) past the first sub-assembly 100A acting as a light source and that the inspection system further comprises a detector optics sub-assembly 250 that may comprise two, adjacent photodetector assemblies 100B-C. Some of the light rays emitted by the source 100A are reflected by the passing container 205 towards the photodetector optics 250. While depicted as reflecting from the outer surface of the container 205, there will also be reflected rays from the inner wall of the container 205, which are not shown in FIG. 2 for clarity. The receiver optical sub-assemblies 100B-C can be of similar construction as optical light source sub-assembly 100A, except equipped with a photodetector 130B, 130C as opposed to a light source. The lenses 110B, 110C of the photodetector assemblies 100B-C may be again arranged to focus the collimated light rays from the light source sub-assembly 100A and reflected by the container 205 onto the photodetectors 130B-C. Optical filters 140B-C allow reference wavelength and an absorption wavelength to the respective receiving elements 130B-C. That is, the optical filter 140B of the first photodetector assembly 100B may filter out wavelengths other than a reference wavelength such that the photodetector 130B of the first photodetector assembly 100B receives only light energy around the reference wavelength. On the other hand, the optical filter 140C of the second photodetector assembly 100C may filter out wavelengths other than an absorption wavelength such that the photodetector 130C of the second photodetector assembly 100C receives only light energy around the absorption wavelength (or a narrow absorption wavelength band). "Absorption" here refers to a wavelength that is primarily absorbed by the material of the container. The "reference" wavelength is a wavelength (or narrow wavelength band) where the light energy is not primarily absorbed by the material of the container; e.g., light energy corresponding to a transmissive band for the material of the container in order to provide a reference relative to the absorption wavelength. As used herein, a wavelength "band" means a wavelength band that is less than or equal to 200 nm full width at half maximum (FWHM).

A computer system or processor connected to the photodetector optics 250 can compute the wall thickness of the container by evaluating the relationship between the absorption characteristics of the reflected light. That is, light that reflects off the outer surface of container wall will not be absorbed by the container wall, and less light will be reflected off the inner surface of the container wall than the outer surface because a portion of the incident light energy is absorbed by the container wall.

Figure 3:
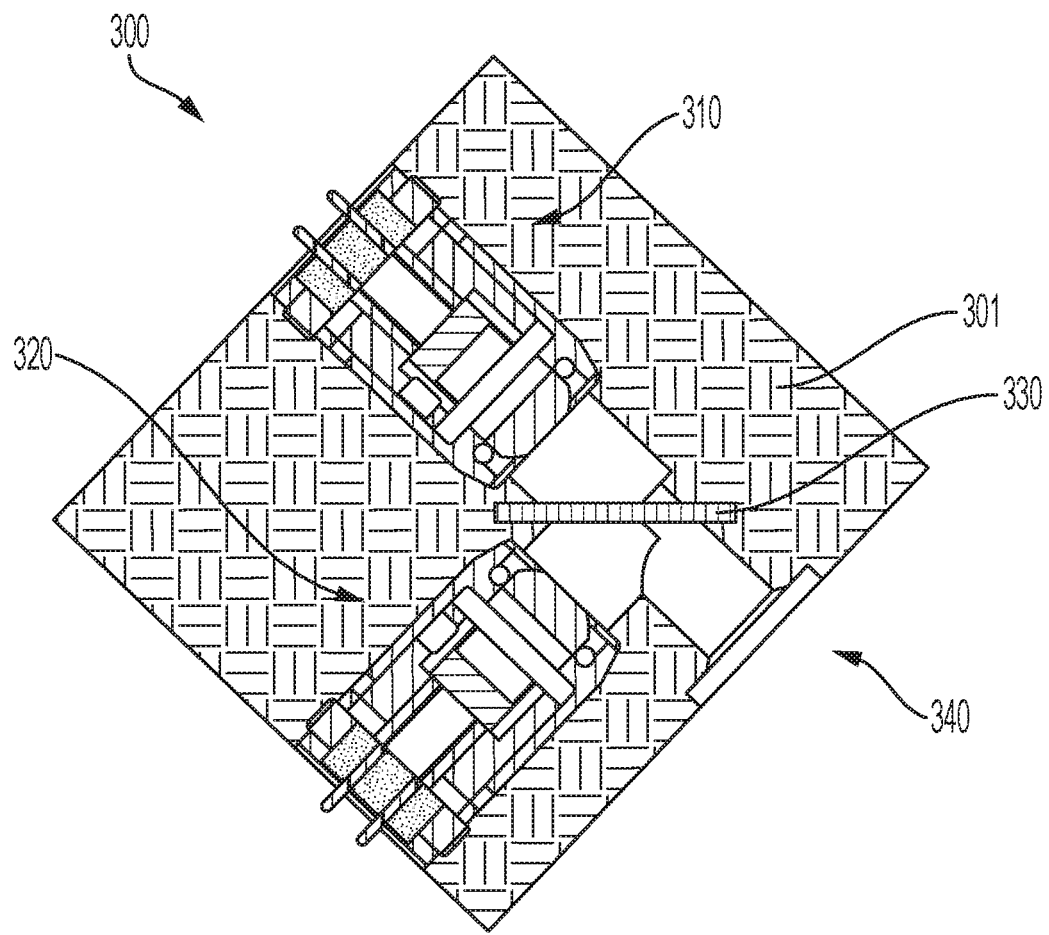
FIG. 3 illustrates schematically an example of the combined optical sub-system.

Since the light wavelengths transmitted from optical sub-system 100A are incident from the same origin and generate a sufficiently large spot on the container 205, on the order of 5 mm to 10 mm in diameter, for example, relative to any container decoration, the ratio of light absorption relative to thickness remains unhampered by the decorations or non-parallel walls, if any, of the container. A further refinement of the optical subsystem is shown in FIG. 3. FIG. 3 shows a dual optical sub-system 300 that contains the same optical elements as previously described in connection with FIG. 1, but combined in a common structure 301. Within the structure may be two optical subassemblies 310, 320, which may be configured as either light transmitters or detectors. Similar to the optics sub-assemblies described in connection with FIG. 1, these optical subassemblies 310, 320 may comprises an optical component (e.g., emitter or detector), a component holder, a lens and a filter. Also housed within the structure 301 may be a dichroic reflector 330, which passes or receives a desired wavelength to the optical subassembly 310 while reflecting an alternate wavelength to or from the optical subassembly 320. In this manner, light which enters or exits the structure 301 via an opening 340 will appear to function from a common origin. For example, the dichroic reflector 330 reflects a portion of the incoming light to the first sub-assembly 310, and its filter may filter out all wavelengths except the reference wavelength. Similarly, the dichroic reflector 330 reflects a portion of the incoming light to the second sub-assembly 320, and its filter may filter out all wavelengths except the absorption wavelength. Conversely, when operated as an emitter, the dichroic reflector 330 may reflect light energy from the first source 310 at the first wavelength toward the opening 340, and reflect light energy from the second source 320 at the second wavelength toward the opening 340.

The opening 340 may be equipped with a protective cover, a selective optical filter or a precision optical slit depending on the particular application for the sub-assembly 300. In various embodiments, more dichroic reflectors and more than two optical subsystems (e.g., detectors or emitters) may be included in the sub-assembly if more than two selective wavelengths are desired. It may be desired for instance to add a third wavelength that is absorptivity selective to water or fog to further eliminate potential sources of error in the measurement. Plastic containers that have internal barrier layers would be another example of the need for a third selective wavelength. In this configuration, the reflected components for the absorptive wavelength for each plastic type could be ratioed against the reference wavelength to report the thickness of both types of plastic.

Figure 4:
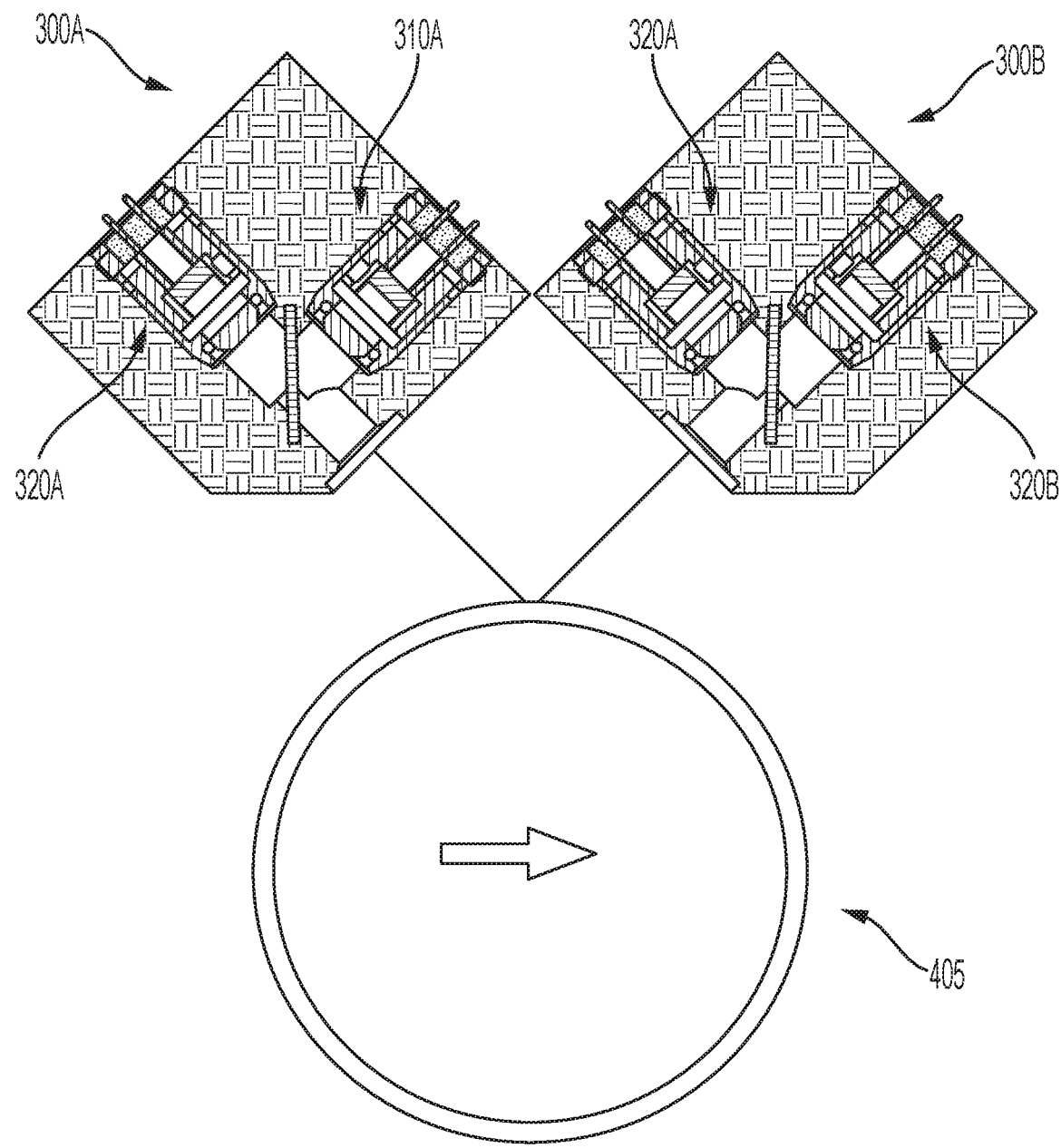
FIGS. 4 and 4A illustrate schematically simplified examples of preferred embodiments of the measurement system.

A measurement system comprising two of the combined optical subassemblies 300A-B is depicted in FIG. 4. In the depicted embodiment, the optical assemblies 300A-B are positioned to measure a characteristic (e.g., wall thickness) of a passing container 405. The first optical assembly 300A may be equipped with light sources and correspondingly the second optical assembly 300B would have light receivers, although the reverse set up could also be used. The container 405 passing by (moving left to right) ensures that reflections are created for the signals to be received. That is, light that is emitted from the light source sub-assembly 300A is reflected by the container 405 toward the detector sub-assembly 300B. The light source sub-assembly 300A may emit two wavelength bands (e.g., the absorption and reference wavelengths), from light sources 310A, 320A respectively, simultaneously or sequentially. Correspondingly, the dichroic reflector 330B of the detector sub-assembly 300B may direct portions of the reflected light to each detector sub-assembly 310B, 320B. Based on the reflected light at each of these wavelengths, a processor can determine the wall thickness of the container 405.

Figure 4A:
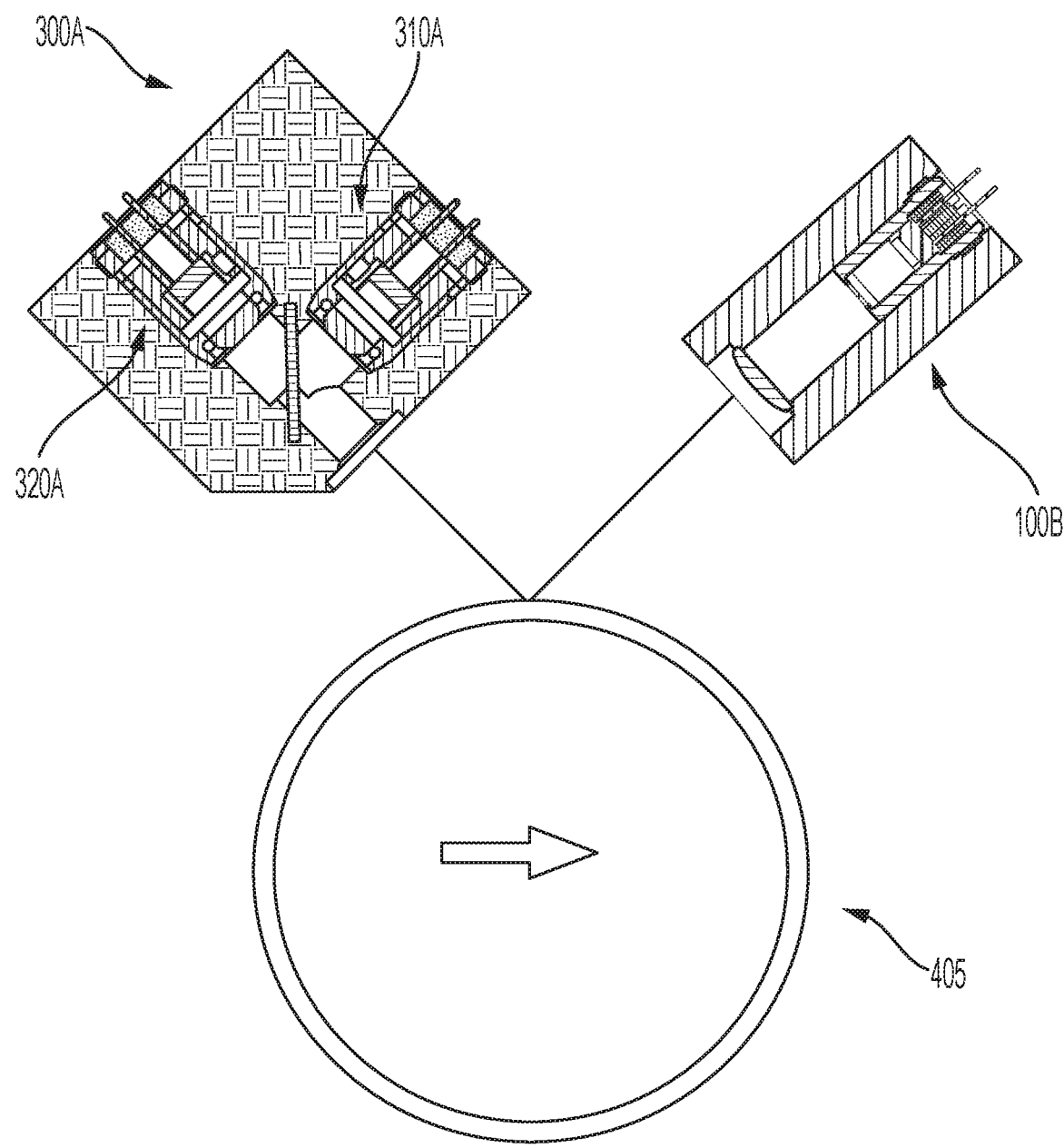

In another embodiment, when the light sources 310A, 320A are operated sequentially, then a single detector 100B could be used as shown in FIG. 4A to reduce cost. Such a detector 100B does not require a dichroic reflector 330 when the light sources 310A, 320A are operated sequentially. As such, an electronic controller can be connected to and control the operation of the light sources 310A, 320A to operate them (that is, turn on the light sources) synchronously as in the embodiment of FIG. 4 or to operate them sequentially as in the embodiment of FIG. 4A, for example.

Figure 5A:
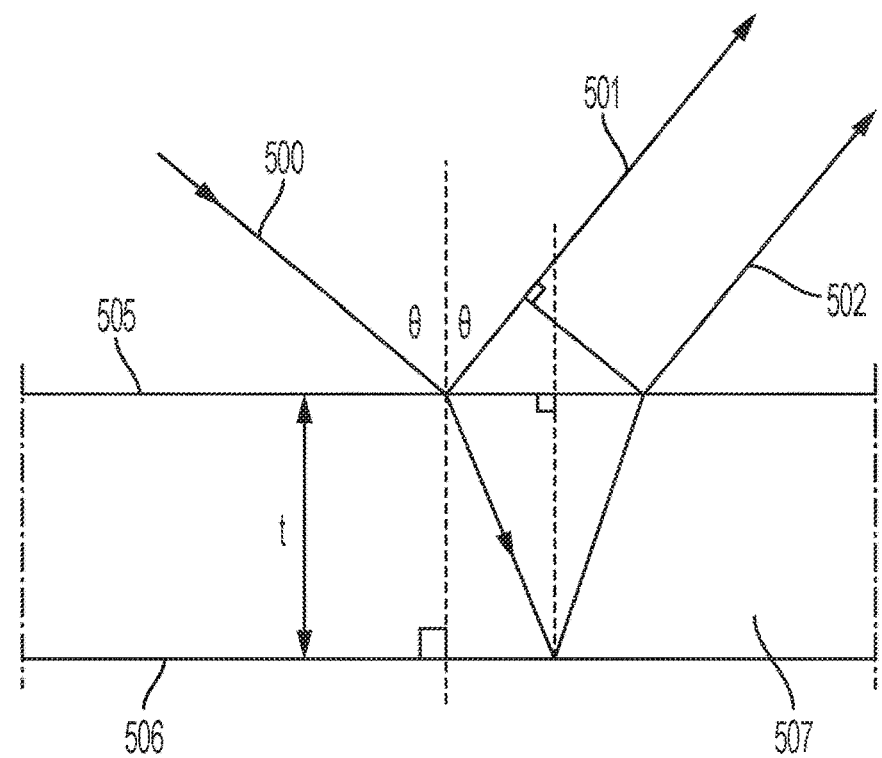
FIG. 5a represents the optical nature of the preferred embodiment system.
Figure 6A:
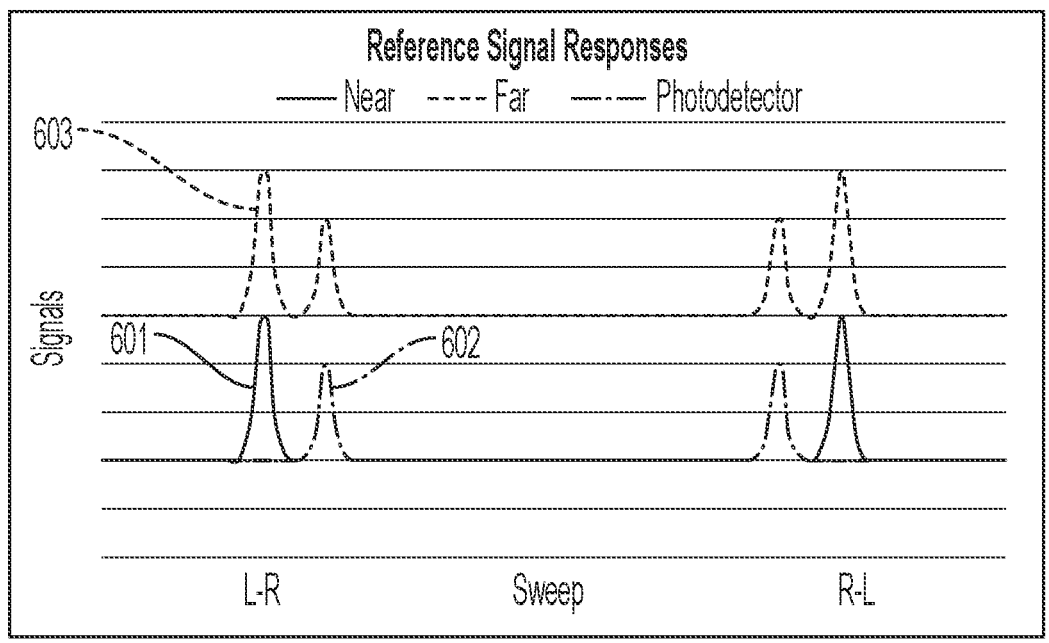
FIGS. 6a-6c represent signals from a container with smooth surfaces and parallel walls.
Figure 6B:
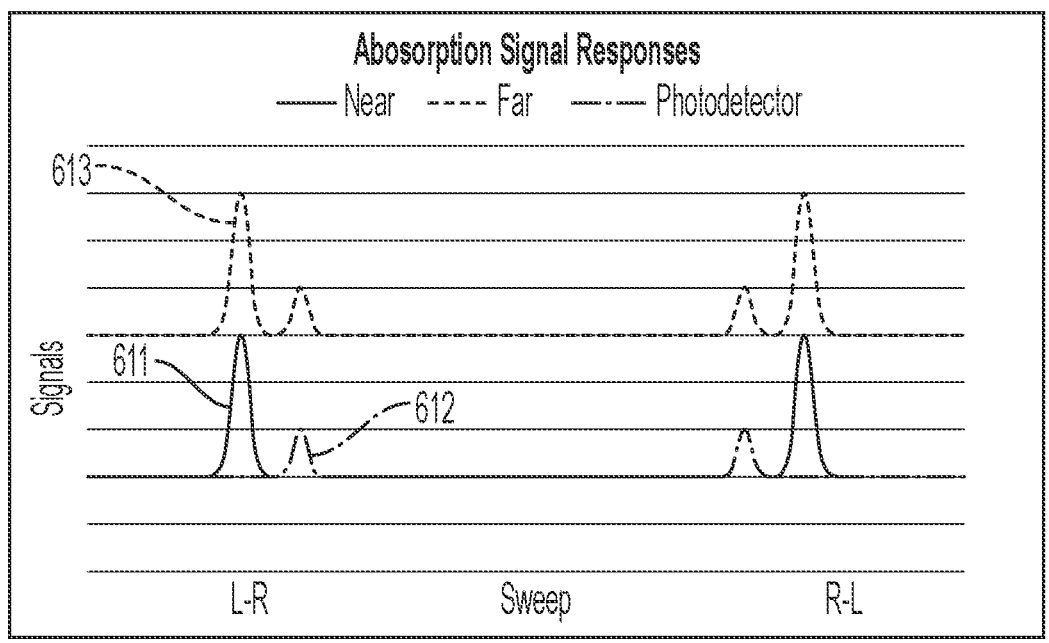
Figure 6C:
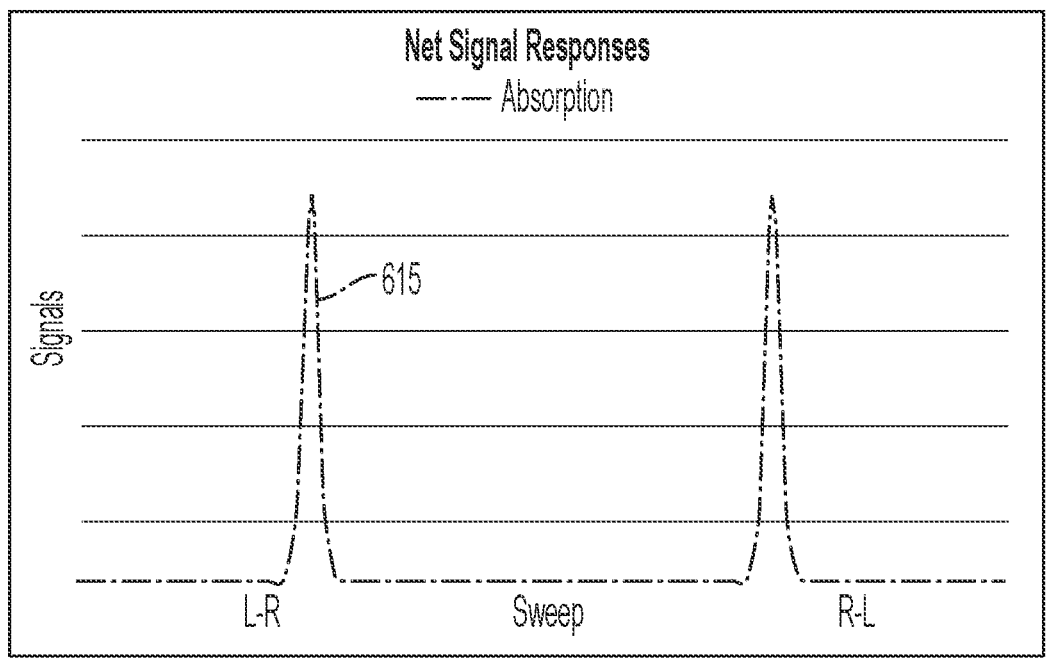

FIG. 5a depicts the creation of the reflections from the inner and outer walls 505, 506 of the container wall 507. As depicted in FIG. 6a-6c, the container passing by will create a series of pulses in the optical system. For reference, all of the figures show the signals as the container passes left to right, labeled L-R, and right to left, labeled R-L. The direction of the container movement and the relative positions of the emitters and detectors affects the arrangement the pulses.

Now referring to the optical reflection diagram FIG. 5a and the light intensity signals diagram FIG. 6a, these diagrams are for the simplified situation when the container is thick and the surfaces are smooth and parallel. The reflection 501 in FIG. 5a from the near or outside wall 505 can be seen as component 601 of FIG. 6a of the reference wavelength photodiode signal 603. As the container moves left to right, the reflection 502 from the inside or far wall 506, can be seen as component 602 of FIG. 6a of the reference wavelength photodiode signal 603. Signal component 602 (for the intensity of the sensed light from the inside or far wall 506) is less than signal component 601 (for the intensity of the sensed light from the outside wall 505) since some light was redirected due to the first reflection 501. The differences in and time-spacing of these signal components 601, 601 can be used to determine the thickness of the container wall. It should also be recognized that the signal component 602 may be created in the presence of a fluid filled container.

Since the incident light 500 in FIG. 5a may contain both a reference and absorptive wavelength component, FIG. 6b shows a similar diagram as FIG. 6a for such a scenario. The reflection 501 from the near or outside wall 505 is shown as component 611 of the absorptive wavelength photodiode signal 613. As the container moves left to right, the reflection 502 from the inside or far wall 506 is shown as component 612 of the absorptive wavelength photodiode signal 613. The signal component 612 is less than the signal component 611 since some light was reflected as part of the first reflection 501 and some of the light was absorbed by the container wall (with the amount of light absorbed being dependent on the thickness of the wall). The signal component 612 is also less than the signal component 602 due to the absorption by the container wall, with the difference being related to the path length that the light travels within the container. It is this principle of reflective absorptiometry that determines the container thickness.

FIG. 6c is a diagram which is related to the container thickness. In this diagram, the photodiode signal 613 from the absorptive wavelength channel has been electrically subtracted from the photodiode signal 603 for the reference wavelength. The amplitude of this difference signal 615 is therefore related to the container thickness. Any suitable manner can be used to derive this difference signal. For example, if the reference and absorptive signals are analog, they can be subtracted by an amplifier circuit. If the reference and absorptive signals are digitized by an analog-to-digital converter, then they can be summed piecewise and then subtracted. Additionally, the digitized signals can be then filtered digitally or integrated and the areas under the curve compared. Many methods of comparison are possible.

While there are container designs that are smooth and well formed, their defective counterparts, which are of particular interest to be eliminated and reported, are not smooth and well formed. In addition, other containers may not be smooth or present parallel walls by design. It is therefore a further object of the invention to provide a novel means for their inspection.

Figure 7A:
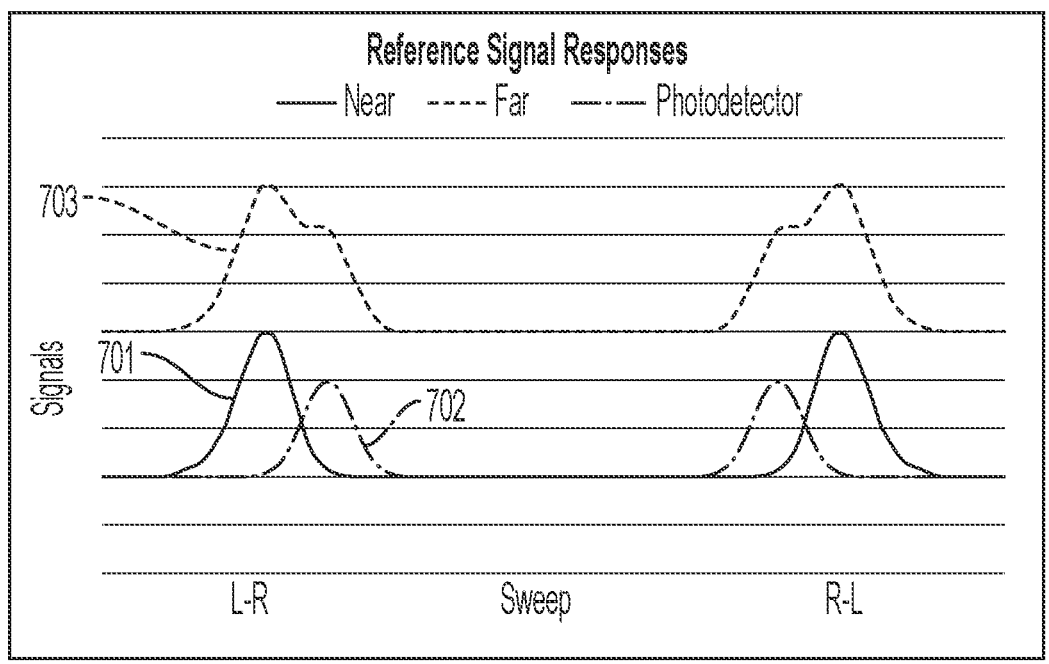
FIGS. 7a-7c represent signals from a container with rough surfaces and parallel walls.
Figure 7B:
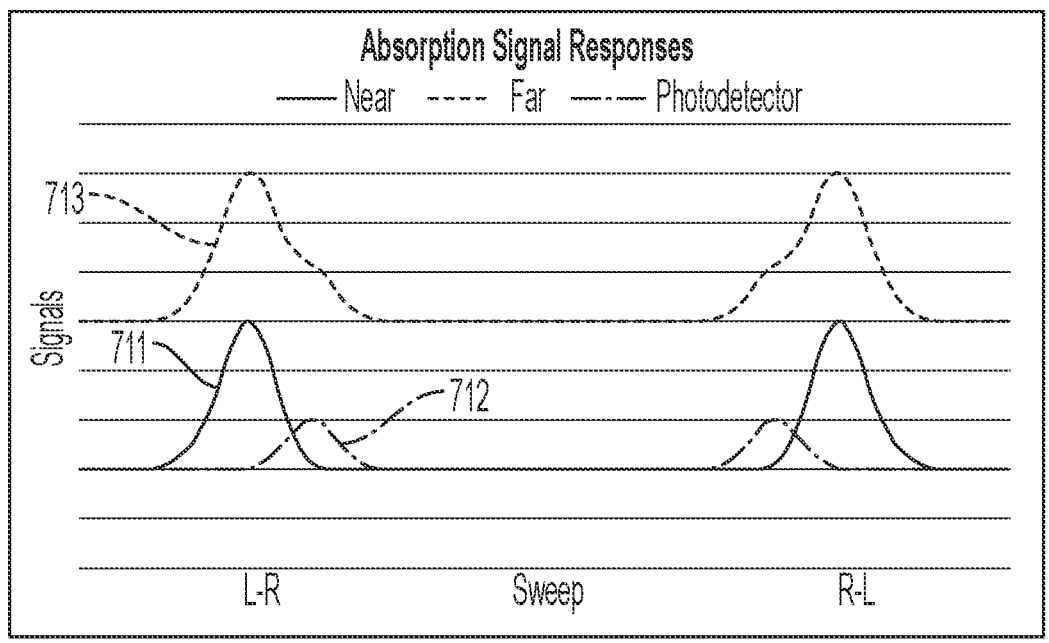
Figure 7C:
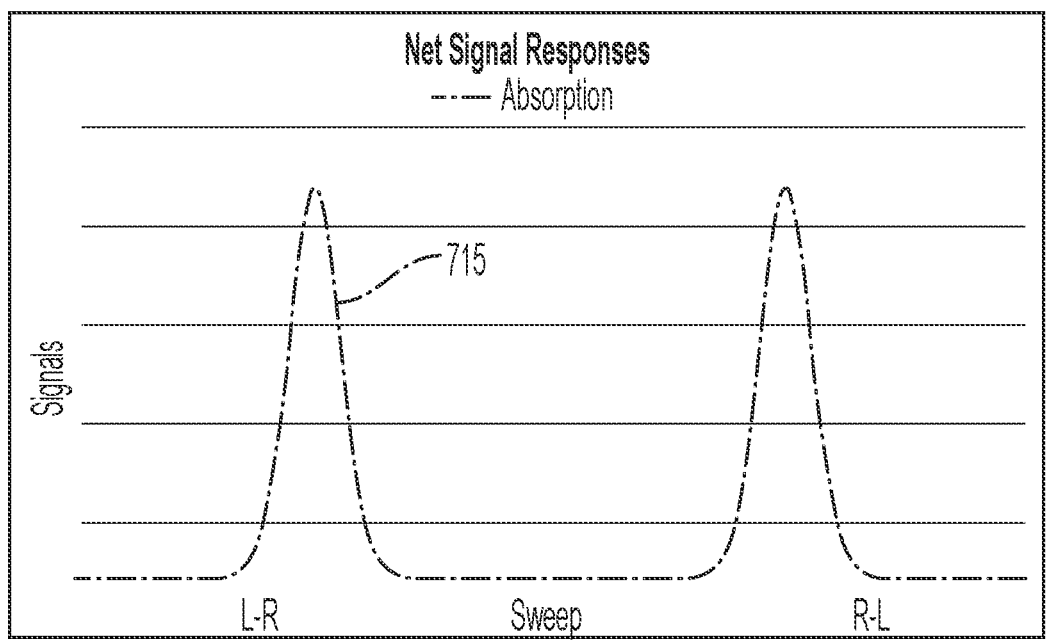

When the container surface is rough or decorated, the reflected signals 501,502 are not as well defined as when the surface is smooth. FIGS. 7a-7c are representative of this condition and are further explained as follows. As previously described, the reference wavelength signals 701 and 702 produce the photodiode signal 703 shown in FIG. 7a. In addition, the absorptive wavelength signals 711 and 712 produce the photodiode signal 713 in FIG. 7b. A comparison of the reference wavelength photodiode signals 703 to the signal 603 in FIG. 6a show a loss of fidelity in the signals due to the surface roughness. It is even more prevalent when examining the absorptive wavelength photodiode signal 713 in FIG. 7b to the corresponding signal 613 in FIG. 6b. In spite of this loss of clarity and fidelity, when the absorptive wavelength photodiode signal 713 is subtracted from the reference wavelength photodiode signal 703, a clear and well defined signal 715, as shown in FIG. 7c. The magnitude of this signal is still in relation to the container thickness and can be processed in the same manners as previously described.

Figure 8A:
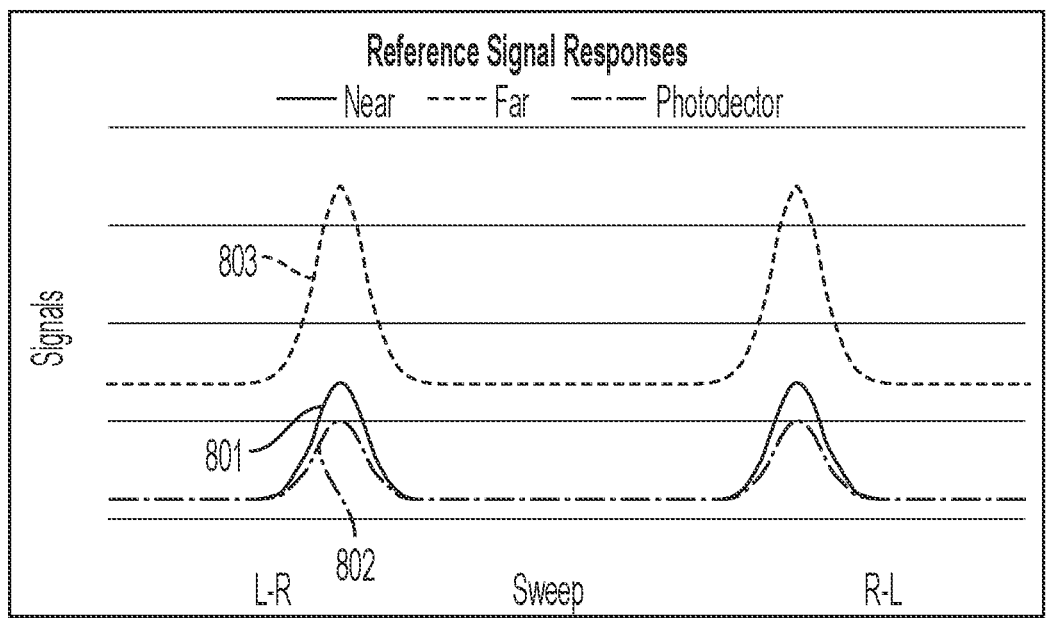
FIGS. 8a-8c represent signals from a container with rough surfaces and non-parallel walls.
Figure 8B:
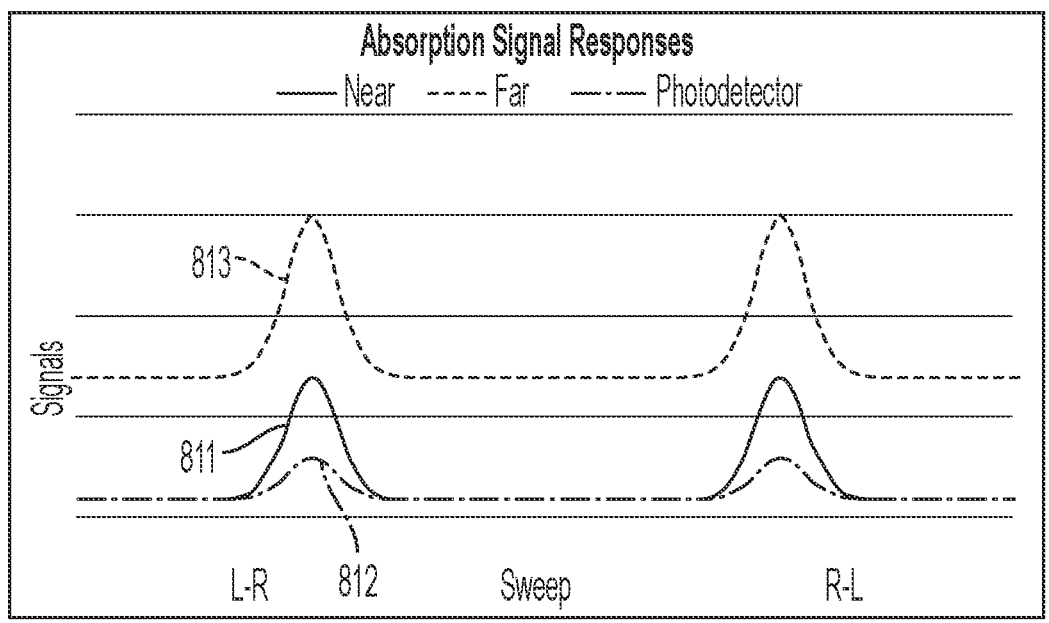
Figure 8C:
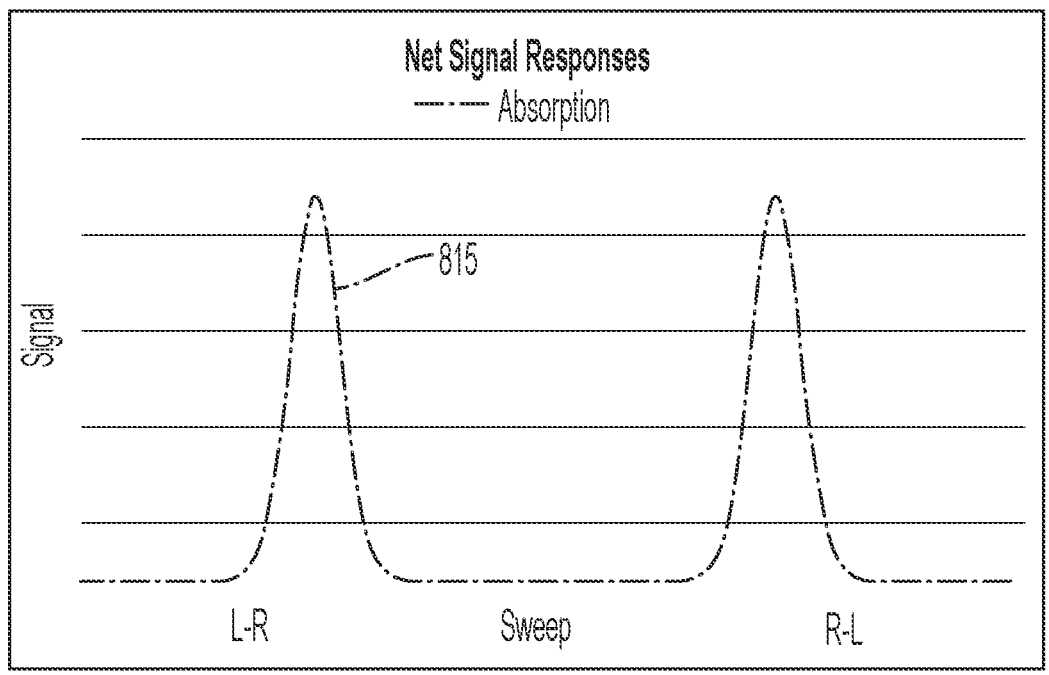

A further complication is that rough surfaces may additionally contain non-parallel walls. Wall-thickness measurements for such non-parallel conditions are can also be determined with embodiments of the present invention. FIGS. 8a-8c are representative of this condition and are further explained as follows. As previously described, the reference wavelength signals 801 and 802 in FIG. 8a produce the photodiode signal 803. In addition, the absorptive wavelength signals 811 and 812 in FIG. 8*b* produce the photodiode signal 813. Again, a comparison of the reference wavelength photodiode signal 803 to the corresponding signal 603 in FIG. 6*a* shows a clear loss of fidelity in the signals due to the surface roughness. In addition, when the walls are not parallel, the position of the reflection 501 from the near or outside wall 505 (see FIG. 5*a*) can become coincident with the reflection 502 from the inside or far wall 506. In this condition, the reference wavelength signals 801 and 802 as well as the absorptive wavelength signals 811 and 812 may align and combine to make a seemingly singular photodiode signal 803, 813, as shown in FIGS. 8*a-b*. It may also be noted that this concurrent signal amplitude may be higher than the prior conditions. Compression techniques, such as log amplifiers or automatic gain control topology amplifiers, may be used to manage the signal conditions.

The loss of fidelity is even more prevalent when examining the absorptive wavelength photodiode signal 813 in FIG. 8*a* to the corresponding signal 613 in FIG. 6*a*. In spite of this further loss of clarity and fidelity, when the absorptive wavelength photodiode signal 813 is subtracted from the reference wavelength photodiode signal 803, a clear and well defined signal 815 is obtained, as shown in FIG. 8*c*. The magnitude of this signal is still in relation to the container thickness and can be processed in the same manner as previously described.

The "signal" shown on the vertical (y-) axis of FIGS. 6A-BC corresponds to the intensity of the light sensed by the respective light sensor.

One final exemplary embodiment is further defined when referring to FIG. 4. In the examples described above in connection with FIG. 4, both optical components of the sub-assemblies 300A-B were the same. That is, the optical components 310A, 320A of sub-assembly 300A were both light emitters, and the optical components 310B, 320B of the sub-assembly 300B were both photodetectors. In another embodiment, each of the sub-assemblies 300A-B may comprise a light source/emitter and a photodetector. For example, if optical sub-system 310A is an emitter, then optical sub-system 310B could be the corresponding receiver. Correspondingly, the optical sub-system 320B could be an emitter with the optical sub-system 320A being the corresponding receiver. As such, the sub-assembly 300A has one emitter 310A and one receiver 320A integrated into one sub-assembly; similarly, the sub-assembly 300B has one emitter 320B and one receiver 310B integrated into one sub-assembly.

Figure 5B:
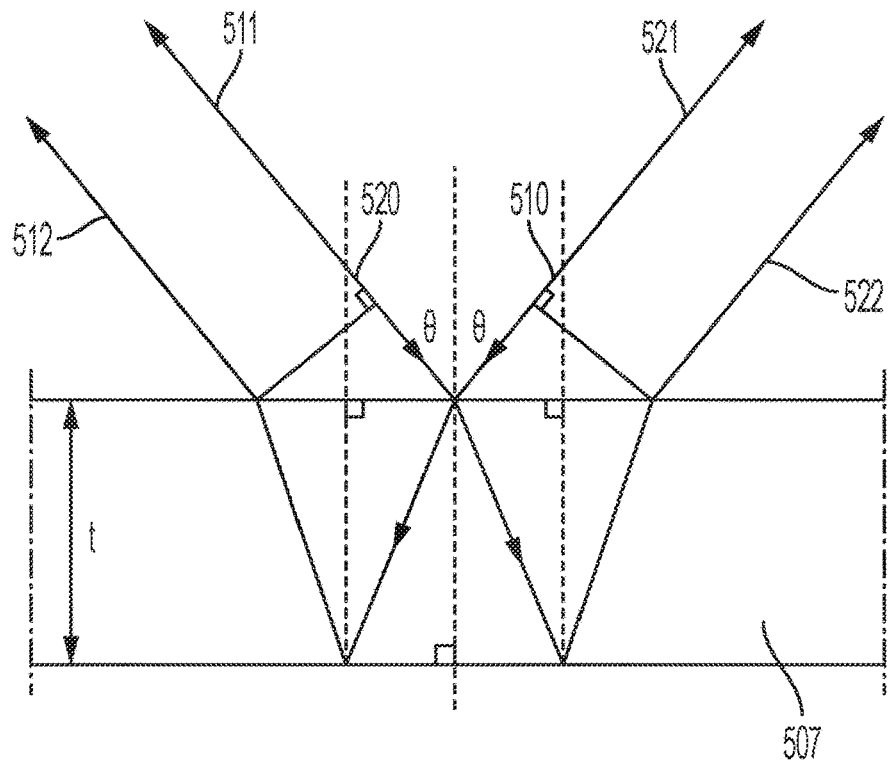
FIG. 5b represents the optical nature of an alternate preferred embodiment system.

When referring to FIG. 5*b*, the incident beam 510 would originate from the optical assembly 300B (see FIG. 4) and produce reflections 511, 512. In addition, the incident beam 520 would originate from the optical assembly 300A and produce reflections 521, 522. As the container passes by, there would be a point in time when both incident beams are overlapping as depicted in FIG. 5*b*. Since, in various embodiments, one optical assembly would emit the reference wavelength and the other the absorptive wavelength, all previously described conditions and aspects of the invention would be viable.

When the spacing between the reflections 511, 512 and 521,522 are the same, the outer and inners walls 505, 506 are parallel. When they are not, a simple average can be used to calculate the container thickness. This and other aspects of known reflective-based prior art inspection systems for blow-molded containers would be at times usable in conjunction with the reflective absorptiometry principals but not a necessity to practice the novelty of the invention.

In general, it will be apparent to one of ordinary skill in the art that at least some of the embodiments described herein may be implemented utilizing many different embodiments of software, firmware, and/or hardware. The software and firmware code may be executed by a computer or computing device comprising a processor (e.g., a DSP or any other similar processing circuit). The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated with a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

In addition, the container being inspected (e.g., container 205 in FIG. 2, container 405 in FIG. 4) may be formed using, for example, a reheat, stretch and blow molder (sometimes referred to simply as a "blow molder"). The blow molder may receive plastic preforms and output the plastic container. When a preform is received into the blow molder, the preform may be initially heated and placed into a mold. A rod stretches the preform while a fluid, such as air, is being blown into the preform causing the preform to stretch axially and circumferentially, and take the shape of the mold. In other embodiments, the fluid used to stretch the preform is a liquid instead of air. That is, the preform is stretched to the container's shape with the end-product liquid. After formation, the container may be conveyed (e.g., left to right in FIGS. 2 and 4) past the optical sub-assemblies 100A-100C, 300A-B using, for example, a conveyor belt, transfer arms (see e.g., U.S. Pat. No. 6,863,860), or any other suitable means for moving or conveying the container over time past the optical sub-assemblies 100A-100C, 300A-B.

The determined wall thickness by the processor/computer could be used for one or more purposes. For example, a reject mechanism could reject containers whose wall thickness is not within pre-established limits. Also, the measured wall thicknesses of the containers could be used in a feedback loop to control parameters of the blow molder, such as the oven temperature, total oven power, individual oven lamp power, preform temperature set point, pre-blow start, pre-blow duration, stretch rod timing, blow pressure, pre-blow timing, pre-blow pressure, power levels for individual heater elements of the plurality of molds, preform temperature set points, stretch rod timing, stretch rod temperature, blow pressure, etc.

In one general aspect, therefore, the present invention is directed to an apparatus for inspecting a transparent hollow article, such as the containers 205, 405 shown in FIGS. 2 and 4. The "inspection" apparatus comprises at least one light source for emitting light energy at a portion of the transparent hollow article as the transparent hollow article moves along a travel path past the at least one light source. The light energy emitted by the at least one light source comprises (1) light energy at a first, absorption wavelength that is primarily absorbed by the portion of the transparent hollow article; and (2) light energy at a second, reference wavelength that is not primarily absorbed by the portion of the transparent hollow article. The inspection apparatus also comprises first and second, spaced-apart, light sensor sub-assemblies. The first and second adjacent light sensor sub-assemblies are on the same side of the travel path of the transparent hollow article as the at least one light source. Each light sensor sub-assembly comprises (a) a light sensor for sensing light energy emitted by the at least one light source that is reflected by the portion of the transparent hollow article to the light sensor assembly; and (b) a filter, where: (i) the filter of the first light sensor sub-assembly filters out light energy outside of the absorption wavelength; and (ii) the filter of the second light sensor sub-assembly filters out light energy outside of the reference wavelength. The inspection apparatus further comprises a processor in communication with the first and second adjacent light sensor assemblies. The processor is programmed to compute a wall thickness of the portion of the transparent hollow article based on an intensity of light energy sensed by both the first and second adjacent light sensor sub-assemblies. Time domain information is not required to determine thickness.

In another general aspect, the inspection apparatus comprises, as shown in the example of FIG. 4A, first and second light sources 310A, 320A, where the separate light sources are operated sequentially, and where the first light source emits light energy in the absorption wavelength for the article, and the second light source emits light energy at the reference wavelength. A single light sensor 100B sense the light energy emitted by the first and second light sources that is reflected by the portion of the transparent hollow article. The inspection apparatus further comprises a processor in communication with the light sensor for computing the wall thickness of the article based on the intensity of light energy sensed by the light sensor.

In another general aspect, the present invention is directed to a method for inspecting a transparent hollow article. The method comprises the step of emitting light, by at least one light source, at a portion of the transparent hollow article as the transparent hollow article moves along a travel path past the at least one light source. The light energy emitted by the at least one light source comprises: (1) light energy at a first, absorption wavelength that is primarily absorbed by the portion of the transparent hollow article; and (2) light energy at a second, reference wavelength that is not primarily absorbed by the portion of the transparent hollow article. The method also comprises the step of sensing, by both first and second, spaced-apart, light sensor sub-assemblies, light energy emitted by the at least one light source that is reflected by the portion of the transparent hollow article to the light sensor assembly. The first and second adjacent light sensor sub-assemblies are on the same side of the travel path of the transparent hollow article as the at least one light source. Each light sensor sub-assembly comprises a light sensor for sensing the light energy emitted by the at least one light source that is reflected by the portion of the transparent hollow article to the light sensor assembly and a filter. The step of sensing the light energy comprises: (i) filtering out, by the filter of the first light sensor sub-assembly, light energy outside of the absorption wavelength; and (ii) filtering out, by the second light sensor sub-assembly, light energy outside of the reference wavelength. The method further comprises the step of computing, by a processor in communication with the first and second adjacent light sensor assemblies, a wall thickness of the portion of the transparent hollow article based on an intensity of light energy sensed by both the first and second adjacent light sensor sub-assemblies.

In various implementations, the first and second light sensor sub-assemblies are integrated in a combined sensor assembly such that the filters of the first and second light sensor sub-assemblies are non-parallel. In such a case, the combined sensor assembly may comprise a reflector, e.g., a dichroic reflector, for reflecting a first portion of the light energy reflected by the portion of the transparent hollow article to the first light sensor sub-assembly and a second portion of the light energy reflected by the portion of the transparent hollow article to the second light sensor sub-assembly.

Also, the at least one light source comprises first and second light sources, wherein the first light source emits light energy in the absorption wavelength and the second light source emits light energy in the reference wavelength. In such circumstances, the first and second light sources may be combined in a common emitter assembly, which may comprise a reflector for reflecting light energy from both the first and second light sources to a common opening of the emitter assembly.

In yet other implementations, (a) a first optical assembly comprises the first light source and the second light sensor sub-assembly, and (b) a second optical assembly comprises the second light source and the first light sensor sub-assembly. In such an implementation, the first and second optical assemblies may be oriented relative to the travel path of the transparent hollow article such that, as shown in FIG. 4, (i) light energy from the first light source of the first optical assembly is reflected by the transparent hollow article toward the second optical sub-assembly, and (ii) light energy from the second light source of the second optical assembly is reflected by the transparent hollow article toward the first optical sub-assembly.

In various implementations, transparent hollow article is filled with a fluid, such as air and/or a liquid, while the transparent hollow article moves along the travel path and is being inspected by the inspection apparatus.

In yet another general aspect, the present invention is directed to a method for manufacturing a transparent hollow article. The method comprises forming the transparent hollow article with an article-forming apparatus, such as a blow molder. The method also comprises, after forming the transparent hollow article, inspecting the transparent hollow article with any of the above-described inspection systems. In various implementations, the step of forming the transparent hollow article may comprises stretching a perform with a fluid, such as air and/or a liquid, to form the transparent hollow article. The method may further comprise the step of controlling a parameter of the article-forming apparatus based on the computed wall thickness of the portion of the transparent hollow article.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An apparatus for inspecting a transparent hollow article, the apparatus comprising
    at least one light source for emitting light energy at a portion of the transparent hollow article as the transparent hollow article moves along a travel path past the at least one light source, wherein the light energy emitted by the at least one light source comprises:
        light energy at a first, absorption wavelength that is primarily absorbed by the portion of the transparent hollow article; and
        light energy at a second, reference wavelength that is not primarily absorbed by the portion of the transparent hollow article;
    at least one light sensor for sensing light energy emitted by the at least one light source that is reflected by the portion of the transparent hollow article to the at least one light sensor, wherein the at least one light sensor is on the same side of the travel path of the transparent hollow article as the at least one light source; and
    a processor in communication with the at least one light sensor, wherein the processor is programmed to compute a wall thickness of the portion of the transparent hollow article based on an intensity of light energy sensed by the at least one light sensor.

2. The apparatus of claim 1, wherein:
    the at least one light source comprises first and second separate light sources, wherein each of the first and second light sources are for emitting light energy at the portion of the transparent hollow article as the transparent hollow article moves along the travel path past the first and second light sources;
    the first light source emits light energy at the first, absorption wavelength;
    the second light source emits light energy at the second, reference wavelength;
    the at least one light sensor comprises a single light sensor; and
    the apparatus for comprises a controller for sequentially operating the first and second light sources.

3. The apparatus of claim 1, wherein:
    the at least one light sensor comprises first and second spaced-apart light sensors;
    the first light sensor is part of a first light sensor sub-assembly that comprises the first light sensor and a first filter;
    the second light sensor is part of a second light sensor sub-assembly that comprises the second light sensor and a second filter;
    the first and second light sensor sub-assemblies are on the same side of the travel path of the transparent hollow article as the at least one light source;
    the first filter of the first light sensor sub-assembly is for filtering out light energy outside of the absorption wavelength;
    the second filter of the second light sensor sub-assembly is for filtering out light energy outside of the reference wavelength; and
    the processor is in communication with the first and second light sensors, and wherein the processor is programmed to compute the wall thickness of the portion of the transparent hollow article based on the intensity of light energy sensed by the first and second light sensors.

4. The apparatus of claim 3, wherein:
    the first and second light sensor sub-assemblies are integrated in a combined sensor assembly such that the filters of the first and second light sensor sub-assemblies are non-parallel; and
    the combined sensor assembly comprises a reflector for reflecting a first portion of the light energy reflected by the portion of the transparent hollow article to the first light sensor sub-assembly and a second portion of the light energy reflected by the portion of the transparent hollow article to the second light sensor sub-assembly.

5. The apparatus of claim 4, wherein the reflector comprises a dichroic reflector.

6. The apparatus of claim 3, wherein:
    the at least one light source comprises first and second light sources; and
    the first light source emits light energy in the absorption wavelength and the second light source emits light energy in the reference wavelength.

7. The apparatus of claim 6, wherein
    the first and second light sources are combined in a common emitter assembly; and
    the common emitter assembly comprises a reflector for reflecting light energy from both the first and second light sources to a common opening of the emitter assembly.

8. The apparatus of claim 3, further comprising:
    a first optical assembly that comprises the first light source and the second light sensor sub-assembly; and
    a second optical assembly that comprises the second light source and the first light sensor sub-assembly,
    wherein the first and second optical assemblies are oriented relative to the travel path of the transparent hollow article such that:
        light energy from the first light source of the first optical assembly is reflected by the transparent hollow article toward the second optical assembly; and
        light energy from the second light source of the second optical assembly is reflected by the transparent hollow article toward the first optical sub-assembly.

9. The apparatus of claim 1, wherein the transparent hollow article is filled with air.

10. The apparatus of claim 1, wherein the transparent hollow article is filled, at least partially, with a liquid.

11. The apparatus of claim 1, wherein the portion of the transparent hollow article comprises a sidewall of the transparent hollow article.

12. A method for inspecting a transparent hollow article, the method comprising:
    emitting light energy, by at least one light source, at a portion of the transparent hollow article as the transparent hollow article moves along a travel path past the at least one light source, wherein the light energy emitted by the at least one light source comprises:
        light energy at a first, absorption wavelength that is primarily absorbed by the portion of the transparent hollow article; and
        light energy at a second, reference wavelength that is not primarily absorbed by the portion of the transparent hollow article;
    sensing, by at least one light sensor, light energy emitted by the at least one light source that is reflected by the portion of the transparent hollow article to the at least one light sensor, wherein the at least one light sensor is on the same side of the travel path of the transparent hollow article as the at least one light source; and computing, by a processor in communication with the at least one light energy sensor, a wall thickness of the portion of the transparent hollow article based on an intensity of light energy sensed by the at least one light energy sensor.

13. The method of claim 12, wherein:

emitting light energy comprises:

emitting light energy, by a first light source, at the first, absorption wavelength at the portion of the transparent hollow article as the transparent hollow article moves along the travel path past the first light source; and emitting light energy, by a second light source, at the second, reference wavelength at the portion of the transparent hollow article as the transparent hollow article moves along the travel path past the first light source;

the method further comprises the step of sequentially operating the first and second light sources;

sensing the light energy comprises sensing by a single light energy sensor; and the processor is in communication with the single light energy sensor; and computing the wall thickness comprises computing, by the processor, the wall thickness of the portion of the transparent hollow article based on the intensity of light energy sensed by the single light energy sensor.

14. The method of claim 12, wherein:

the at least one light sensor comprises first and second spaced-apart light sensors;

the first light sensor is part of a first light sensor sub-assembly that comprises the first light sensor and a first filter;

the second light sensor is part of a second light sensor sub-assembly that comprises the second light sensor and a second filter;

the first and second light sensor sub-assemblies are on the same side of the travel path of the transparent hollow article as the at least one light source;

sensing the light energy comprises:

filtering out, by the first filter of the first light sensor sub-assembly, light energy outside of the absorption wavelength; and filtering out, by the second filter of the second light sensor sub-assembly, light energy outside of the reference wavelength; and computing the wall thickness comprises computing, by the processor, the wall thickness of the portion of the transparent hollow article based on the intensity of light energy sensed by the first and second light sensors.

15. The method of claim 14, wherein:

the first and second light sensor sub-assemblies are integrated in a combined sensor assembly such that the filters of the first and second light sensor sub-assemblies are non-parallel; and the method further comprises reflecting, by a reflector of the combined sensor assembly, a first portion of the light energy reflected by the portion of the transparent hollow article to the first light sensor sub-assembly and a second portion of the light energy reflected by the portion of the transparent hollow article to the second light sensor sub-assembly.

16. The method of claim 14, wherein:

the at least one light source comprises first and second light sources; and emitting the light energy comprises:

emitting, by the first light source, light energy in the absorption wavelength; and emitting, by the second light source, light energy in the reference wavelength.

17. The method of claim 16, wherein the first and second light sources are combined in a common emitter assembly; and the method further comprises reflecting, by a reflector of the common emitter assembly, light energy from both the first and second light sources to a common opening of the emitter assembly.

18. The method of claim 14, wherein:

a first optical assembly comprises the first light source and the second light sensor sub-assembly; and a second optical assembly comprises the second light source and the first light sensor sub-assembly, wherein the first and second optical assemblies are oriented relative to the travel path of the transparent hollow article such that:

light energy from the first light source of the first optical assembly is reflected by the transparent hollow article toward the second optical assembly; and light energy from the second light source of the second optical assembly is reflected by the transparent hollow article toward the first optical sub-assembly.

19. The method of claim 12, wherein the transparent hollow article is filled with air as the transparent hollow article moves along the travel path.

20. The method of claim 12, wherein the transparent hollow article is filled, at least partially, with a liquid as the transparent hollow article moves along the travel path.

21. A method of manufacturing a transparent hollow article, the method comprising:

forming the transparent hollow article with an article-forming apparatus; and after forming the transparent hollow article, inspecting the transparent hollow article with an inspection system, wherein inspecting the transparent hollow article comprises:

emitting light energy, by at least one light source of the inspection system, at a portion of the transparent hollow article as the transparent hollow article moves along a travel path past the at least one light source, wherein the light energy emitted by the at least one light source comprises:

light energy at a first, absorption wavelength that is primarily absorbed by the portion of the transparent hollow article; and light energy at a second, reference wavelength that is not primarily absorbed by the portion of the transparent hollow article;

sensing, by both first and second, spaced-apart, light sensor sub-assemblies of the inspection system, light energy emitted by the at least one light source that is reflected by the portion of the transparent hollow article to the light sensor assembly, wherein:

the first and second, spaced-apart, light sensor sub-assemblies are on the same side of the travel path of the transparent hollow article as the at least one light source; and each light sensor sub-assembly comprises:

a light sensor for sensing the light energy emitted by the at least one light source that is reflected by the portion of the transparent hollow article to the light sensor assembly and a filter, wherein sensing the light energy comprises:
filtering out, by the filter of the first light sensor sub-assembly, light energy outside of the absorption wavelength; and
filtering out, by the second light sensor sub-assembly, light energy outside of the reference wavelength; and
computing, by a processor of the inspection system that is in communication with the first and second, spaced-apart, light sensor sub-assemblies, a wall thickness of the portion of the transparent hollow article based on an intensity of light energy sensed by both the first and second, spaced-apart, light sensor sub-assemblies.

22. A method of manufacturing a transparent hollow article, the method comprising:
forming the transparent hollow article with an article-forming apparatus; and
after forming the transparent hollow article, inspecting the transparent hollow article with an inspection system, wherein inspecting the transparent hollow article comprises:
sequentially emitting light energy, by first and second light sources, at a portion of the transparent hollow article as the transparent hollow article moves along a travel path past the first light source, wherein:
the first light source emits light energy at a first, absorption wavelength that is primarily absorbed by the portion of the transparent hollow article; and
the second source emits light energy at a second, reference wavelength that is not primarily absorbed by the portion of the transparent hollow article;
sensing, by a light sensor, light energy emitted by the first and second light sources that is reflected by the portion of the transparent hollow article to the light sensor, wherein the light sensor is on the same side of the travel path of the transparent hollow article as the first and second light sources; and
computing, by a processor of the inspection system that is in communication with the light sensor, a wall thickness of the portion of the transparent hollow article based on an intensity of light energy sensed by light sensor.

23. The method of any of claims 21 to 22, wherein forming the transparent hollow article comprises stretching a perform with a fluid to form the transparent hollow article.

24. The method of claim 23, wherein the fluid comprises a liquid.

25. The method of any of claims 21 to 22, further comprising controlling a parameter of the article-forming apparatus based on the computed wall thickness of the portion of the transparent hollow article.

26. The apparatus of claim 1, wherein:
the transparent hollow article moves along a travel path in a first direction past the last one light source; and
the at least one light source and the at least one light sensor are spaced apart, on the same side of the travel path of the transparent hollow article, along the first direction.

27. The method of claim 12, wherein:
the transparent hollow article moves along a travel path in a first direction past the last one light source; and
the at least one light source and the at least one light sensor are spaced apart, on the same side of the travel path of the transparent hollow article, along the first direction.

28. The method of claim 21, where:
the first and second, spaced-apart, light sensor sub-assemblies are part of a light sensor assembly;
the transparent hollow article moves along a travel path in a first direction past the last one light source; and
the at least one light source and the light sensor assembly are spaced apart, on the same side of the travel path of the transparent hollow article, along the first direction.

29. The method of claim 22, where:
the first and second light sources are part of a light source assembly;
the transparent hollow article moves along a travel path in a first direction past the last one light source; and
the light source assembly and the light sensor are spaced apart, on the same side of the travel path of the transparent hollow article, along the first direction.

* * * * *